United States Patent [19]

Henecke

[11] Patent Number: 4,762,087
[45] Date of Patent: Aug. 9, 1988

[54] PET FEEDING UTENSIL

[76] Inventor: Daniel C. Henecke, 180 E. Vista Del Cerro, Tempe, Ariz. 85281

[21] Appl. No.: 931,088

[22] Filed: Nov. 17, 1986

[51] Int. Cl.[4] .............................................. A01K 5/01
[52] U.S. Cl. .................................................... 119/61
[58] Field of Search .............. 206/218, 577, 466, 522; 220/427, 854, 218; 119/61; 446/224, 220, 221; 4/499; 40/610; 24/3 F, 3 J, 3 K, 306, 199, 90.5, 241 S

[56] References Cited

U.S. PATENT DOCUMENTS

| 2,551,673 | 5/1951 | Hasselquist | 119/61 |
| 3,012,691 | 12/1961 | Gross et al. | 220/405 X |
| 3,192,680 | 7/1965 | Mantell et al. | 220/403 X |
| 3,234,685 | 2/1966 | Harrowe | 446/221 X |
| 3,256,575 | 6/1966 | Shibata | 24/3 J |

Primary Examiner—Robert P. Swiatek
Assistant Examiner—Mary E. McNeil
Attorney, Agent, or Firm—Cahill, Sutton & Thomas

[57] ABSTRACT

A dish-like receptacle is formed of pliable sheet material and has inner and outer layers forming the side wall of the receptacle and providing an inflatable air space there between to permit the receptacle to be erected. The receptacle also has a stabilizing member projecting from the base thereof which is also inflatable. When not in use the receptacle and its stabilizing member have air expressed therefrom and are collapsed to fit into a pouch. The pouch has a hook thereon adapted to be connected to a belt or collar of a carrier. There is also provided a fastener for detachably connecting the pouch to the receptacle when the latter is erected for use outside the pouch.

8 Claims, 1 Drawing Sheet

PET FEEDING UTENSIL

TECHNICAL FIELD

This invention is concerned with a portable receptacle for holding food or water for a pet such as a dog.

BACKGROUND ART

Pet owners, especially dog owners, who run, jog or hike frequently take their pets with them on such jaunts. During an extended run or hike it is not at all unusual for the pet to develop a need for water or other nourishment. Feeding the animal is greatly facilitated by having a dish or other receptacle in which to place the water or food.

There are many varieties of pet feeding dishes which can be characterized as being portable. Certainly the light-weight molded plastic feeding dishes which are in common use can be easily moved from one place to another. However, even a light-weight dish is bulky and awkward to carry on a run or a long hike.

There is a need, therefore, for a pet feeding utensil which can be collapsed into a compact form and conveniently carried either by the pet or the pet's owner.

DISCLOSURE OF THE INVENTION

The pet feeding utensil of this invention includes a dish-like receptacle made of pliable sheet material. The side wall of the receptacle is formed of inner and outer layers of this material to provide a space therebetween to receive air to inflate and erect the receptacle for use. A valve member in the side wall of the receptacle admits air and also permits the release of air to deflate, or collapse, the receptacle for storage. The receptacle may also be equipped with an inflatable stabilizing member extending outwardly from its base.

Associated with the receptacle is a pouch of lightweight pliable material. This pouch is adapted to house the receptacle when the latter is deflated, or collapsed. The pouch is preferably provided with a hook member by which the pouch can be attached to the belt or other portion of the clothing of the pet owner or to a collar on the pet. Also, preferably included with the utensil is a detachable fastener for attaching the pouch to the receptacle when the latter is in use to reduce the likelihood of misplacement and loss of the pouch.

BRIEF DESCRIPTION OF THE DRAWING

This invention is described in greater detail hereinafter by reference to the accompanying drawing wherein.

BEST MODES FOR CARRYING OUT THE INVENTION

Figure 1:
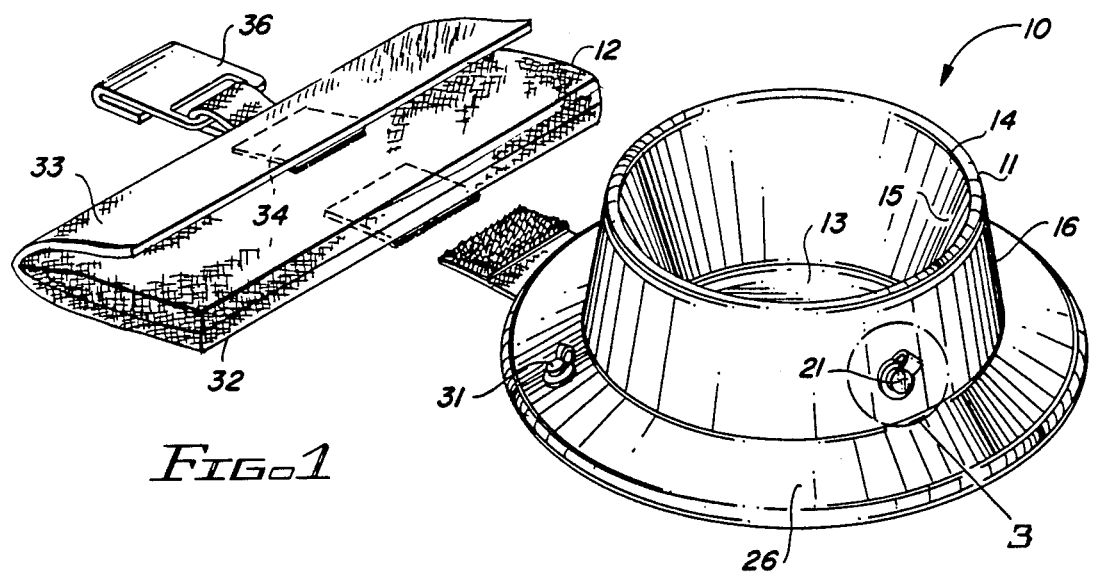
FIG. 1 is a three-quarter perspective view from above showing the pet feeding utensil of this invention in condition and position to receive food or water for the pet.
Figure 2:
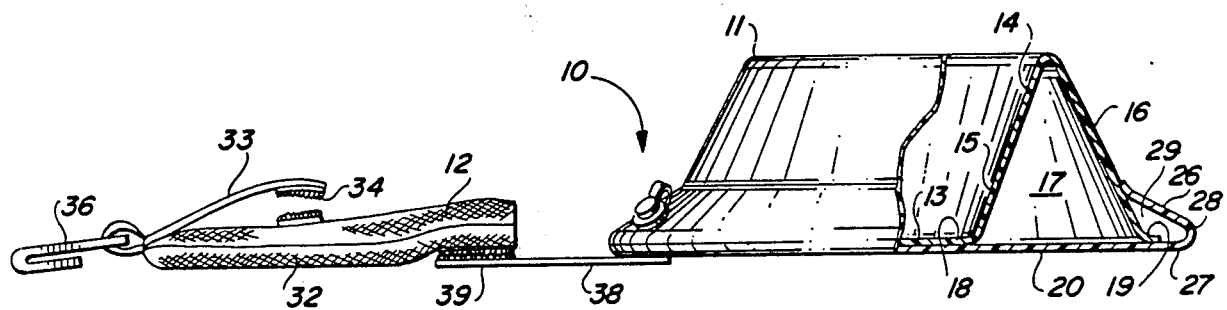
FIG. 2 is an elevational view of the pet feeding utensil with a portion broken away to show the wall construction of the receptacle portion of the utensil.

Referring particularly to FIGS. 1 and 2, the pet feeding utensil of this invention is identified generally by reference numeral 10 and comprises two major components, namely, a dish-shaped receptacle 11 and a carrying pouch 12.

The receptacle 11 is adapted to hold food or water for a pet and when in such use has a bottom wall 13 and a generally circular, upstanding side wall 14. Receptacle 11 is formed of pliable, water resistent sheet material such as, for example, natural or synthetic rubber, or vinyl or polyethylene plastic material. The side wall 14 of receptacle 11 is formed of spaced inner and outer layers, 15 and 16, respectively, to provide an air space 17 within the side wall 14 (see FIG. 2). The inner layer 15 and outer layer 16 of sheet material forming the side-wall 14 are joined at their uppermost edges and gradually diverge from each other so there is considerable space between their lower edges 18 and 19, respectively, which are joined to the material 20 forming the bottom wall 13 of receptacle 11. These lower edges 18 and 19 of inner and outer layers 15 and 16 are attached in an airtight manner to the material 20 forming the bottom wall 13 of the recpetacle 11. The joinder of edges 18 and 19 of inner and outer layers 15 and 16 to sheet material 20 can be effected either by heat sealing or by cementing, both of which procedures are well known in the art.

The construction of receptacle 11 is such that the wall 14 thereof is hollow and contains a toroidal air space of generally triangular cross section. When space 17 contains air under pressure the wall 14 of the receptacle is caused to assume an upright configuration in which it is capable of retaining water or other food for a pet. Conversely, when air is allowed to escape from space 17 the wall 14 of the receptacle 11 collapsed, greatly reducing the bulk of the receptacle 11 and permitting it to be stored in pouch 12.

Figure 3:
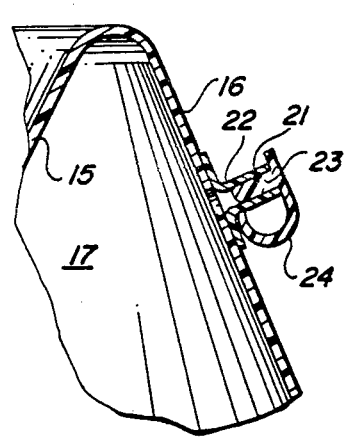
FIG. 3 is an enlarged vertical sectional view through the region of the receptacle identified by the circle 3 in FIG. 1.

The receptacle 14 is provided with means for controlling the admission of air to air space 17 and the exhaustion of air from that space. This means takes the form of a valve member 21 contained in one of the layers 15 and 16 of material forming the side wall 14. The valve member 21 is shown in greater detail in FIG. 3 and is of a type commonly used in inflatable toys. Valve member 21 comprises a flexible plastic molded nipple 22 which is adapted to receive a plug 23. The plug 23 is preferably attached to the nipple 22 by a strap 24. All of the components of the valve member 21 can be unitarily molded of a soft plastic material. The nipple portion 22 of the valve member 21 is either cemented or heat sealed to layer 16 forming side wall 14.

In use, valve member 21 is opened by removing plug 23 to permit the user to blow into the nipple portion 22 of the valve. When the side wall 14 of receptacle 11 is inflated to the desired degree the nipple portion 21 is closed, first by squeezing the nipple between the fingers, and then by inserting plug 23 into the opening in the nipple.

When it is desired to deflate receptacle 11 for storage, the plug 23 is simply withdrawn from the nipple and the air is allowed to escape from air space 17.

The receptacle 11 is also preferably provided with a stabilizing portion 26 extending outwardly from the base of the receptacle. This stabilizing portion 26 is preferably formed of the same pliable material as the remainder of receptacle 11 and comprises a lower layer 27 and an upper layer 28. Layers 27 and 28 are joined together at their outer edges and have their inner edges sealed to the outer layer 16 of side wall structure 14. The upper layer 28 preferably slopes downwardly toward its outermost edge so that any water or food dislodged from the receptacle by the pet will run off the inclined surface and not remain on the stabilizing portion 26.

As can best be seen in FIG. 2 the stabilizing portion 26 of receptacle 11 has a hollow interior containing a toroidal air space 29 which also has a triangular cross section. Means for controlling the entry and exit of air to and from air space 29 can take the form of another valve member 31 like valve member 21 previously described. Alternatively, the air space 29 in stabilizing portion 26 can be in open communication with air space 17 in the receptacle wall 14 in which case the additional valve 31 is not required and valve 21 can be employed to control the admission and expelling of air from both air spaces 17 and 29.

Pouch 12 of the pet feeding utensil is of conventional construction, having a hollow body portion 32 and a flap closure 33. The pouch 12 is preferably made from a flexible fabric made of wear resistant material, such as nylon.

The pouch 12 has an interior sufficiently large to house the receptacle 11 when it is in its deflated, or collapsed, condition. If desired, there can be provided fastening means 34 between the flap closure 33 and the body portion 32 of the pouch 12. The fastening means 34 can take the form of self-adhering fabric fasteners which are in common use today. Such fasteners have one element which has hook-like members on a surface thereof and a second element having a surface of dense fibers in which the hook-like members of the first element become entangled to hold the fastener means together. Such fastener means can be readily attached and detached by the user.

Figure 4:
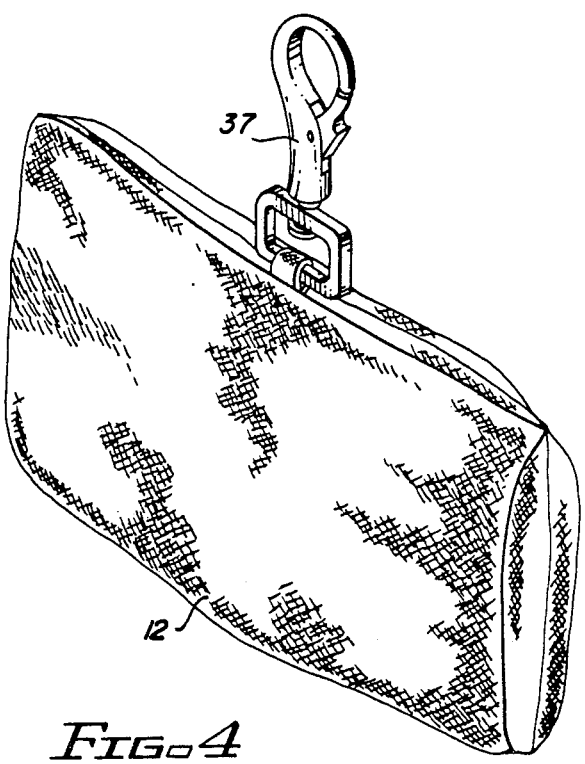
FIG. 4 is a perspective view of the pouch portion of the utensil with a modified carrying hook thereon.

Pouch 12 also is preferably equipped with hook means to permit the pouch to be attached to a carrier. This hook means may take the form of a belt hook 36, as shown in FIGS. 1 and 2, to permit the pouch 12 to be attached to the belt or waistband of the clothing of the pet owner. If desired the pouch 12 can be equipped with a self-latching type hook 37, in place of belt hook 36 such as that illustrated in FIG. 4. This latter type of hook is more suitable for attaching the pouch 12 to the collar of the pet if the pet is to serve as the carrier for the feeding utensil.

Another desirable feature of the pet feeding utensil of this invention is the provision of detachable connector means between the receptacle 11 and the pouch 12. This detachable connector is illustrated in FIGS. 1 and 2 and comprises a strip 38 of flexible material secured to the stabilizing portion 26 of receptacle 11. Strip 38 can be made of the same material as receptacle 11 and either heat sealed or cemented thereto. The opposite end of strap 38 is preferrable provided with a separable fabric fastener 39. This fastener 39 can be of the same type as the fastening means 34 described above. By detachably connecting the pouch 12 to the receptacle 11 it is possible to ensure that these two items will be kept together when the feeding utensil 10 is being used to feed the pet. This reduces the likelihood of the pouch 12 being misplaced from the receptacle 11.

What is claimed is:

1. A pet feeding utensil comprising a dish-shaped receptacle, said receptacle being constructed of pliable sheet material and having one layer forming a bottom wall thereof and inner and outer layers forming the side wall of the receptacle, said inner and outer layers being joined at their uppermost edges and diverging from each other toward their lower edges which are joined to said bottom wall layer to define a containment area therebetween, having a decreasing volume from said uppermost edges toward said bottom wall, said inner and outer layers in combination with said bottom wall to provide a space therebetween which is generally triangular in cross-section, and means in one of said layers for admitting air under pressure to said space to cause the side wall of the receptacle to become erect and for expelling air from said space to permit the side wall to be collapsed, and said side wall remains erect as the contents of the utensil are consumed.

2. The utensil of claim 1 further including a pouch adapted to receive said receptacle when the side wall thereof is in its collapsed condition.

3. The utensil of claim 2 further including means for detachably connecting said receptacle to said pouch when the receptacle is outside the pouch.

4. The utensil of claim 3 wherein said pouch has a hook member thereon to enable the pouch to be connected to a carrier.

5. The utensil of claim 2 wherein said pouch has a hook member thereon to enable the pouch to be connected to a carrier.

6. The utensil of claim 1 further characterized in that said receptacle has an inflatable stabilizing portion extending outwardly from the base thereof to stabilize the receptacle.

7. The utensil of claim 6 further including a pouch adapted to receive said receptacle when the side wall thereof is in its collapsed condition, and means for detachably connecting said stabilizing portion of said receptacle to said pouch when the receptacle is outside the pouch.

8. The utensil of claim 7 wherein said pouch has a hook member thereon to enable the pouch to be connected to a carrier.

* * * * *